United States Patent [19]

Juy

[11] 3,730,012
[45] May 1, 1973

[54] SPEED-CHANGE MECHANISM FOR A BICYCLE

[76] Inventor: Lucien Charles H. Juy, 75 rue General Fauconnet, Dijon, France

[22] Filed: June 7, 1971

[21] Appl. No.: 150,395

[30] Foreign Application Priority Data

June 8, 1970 France..................................7020893

[52] U.S. Cl...............74/242, 74/217 B, 74/242.15 B
[51] Int. Cl...................................................F16h 7/08
[58] Field of Search..................74/242, 242.3, 242.4, 74/217 B, 217 S; 280/261, 236, 238, 274, 281, 282

[56] References Cited

UNITED STATES PATENTS 3,181,383   5/1965   Juy........................................74/217 B

FOREIGN PATENTS OR APPLICATIONS 920,185   3/1963   Great Britain..........................74/242

*Primary Examiner*—Charles J. Myhre
*Assistant Examiner*—Frank H. McKenzie, Jr.
*Attorney*—Waters, Roditi, Schwartz and Nissen

[57] ABSTRACT

A speed change mechanism for a bicycle comprises a displaceable fork connected by a parallelogram linkage to a casing which can be fixed to the frame of the bicycle. The linkage includes a pair of levers, the first of which is connected to a control cable while the second is engagable with a pair of stops to limit the movement of the fork in opposite directions. The casing is a one-piece plastic body with a groove to receive the major portion of the second lever, the latter having a flattened end which selectively engages one of two screws projecting into the groove and serving as the stops.

11 Claims, 6 Drawing Figures

Patented May 1, 1973  3,730,012

Patented May 1, 1973

SPEED-CHANGE MECHANISM FOR A BICYCLE

BRIEF SUMMARY OF THE INVENTION

This invention relates to an improved speed-change mechanism adapted to shift chains on the crank gear sprockets of bicycles and similar vehicles.

An object of the invention is to provide an improved transmission means for bicycles and other machines.

Speed-change mechanisms are known which comprise a transverse chain-shift fork for selectively enabling a chain to run on one of the crank gear sprockets of a bicycle or similar vehicles. The fork is shifted through a cable drive or other control operating the members of a pantograph linkage with a return spring and blocks stopping the displacement of the fork in both directions. The unit is attached to the frame of the bicycle near the crank gear.

Attempts have been made to overcome the considerable drawbacks of such speed-change mechanisms, especially caused by impact and fouling with mud, macadam, gravel, and the like which can impair the operation or distort the fork shift action, particularly in the case of racing bicycles without mud guards.

Attempts have also been made to simplify and improve the assembly and structure of the transmission and to provide effective cooperation of the working parts and improved relative shifts. An appreciably lighter construction has also been sought, this being of special importance in the case of racing bicycles.

In this respect, the speed-change mechanism according to the invention has certain distinctive features, including especially:

a casing specifically adapted for protecting the thrust lever and adjustable stops;

the combination of plastic and metal for various moving parts of the speed-change mechanism, the casing being made of molded plastic;

the utilization of a hinge pin assembly on the casing for pivotal support of a clamping bracket which at the same time serves as an abutment for a cable sheath and a guide conduit for the cable.

DETAILED DESCRIPTION

Figure 1:
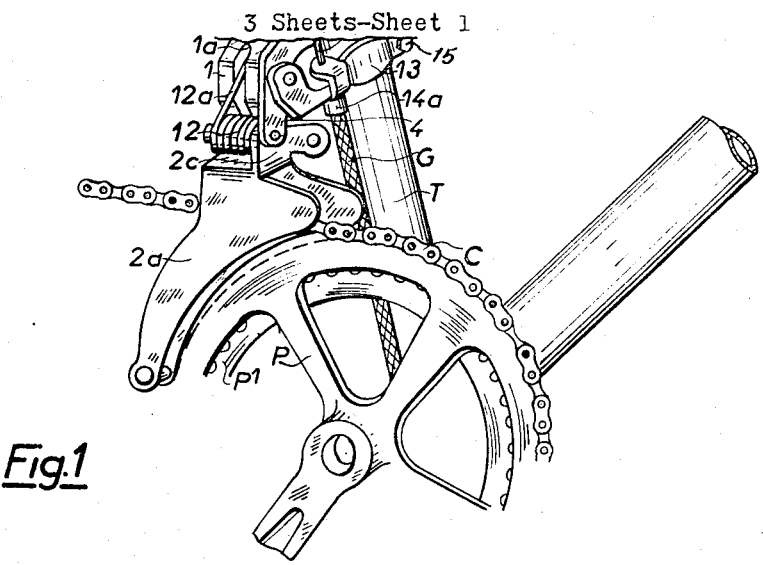
FIG. 1 is an overall perspective view of a speed-change mechanism according to one embodiment of the invention, depected in assembly close to the drive or crank gears of a bicycle, and ready for transverse shifting of a chain on associated gear sprockets.
Figure 2:
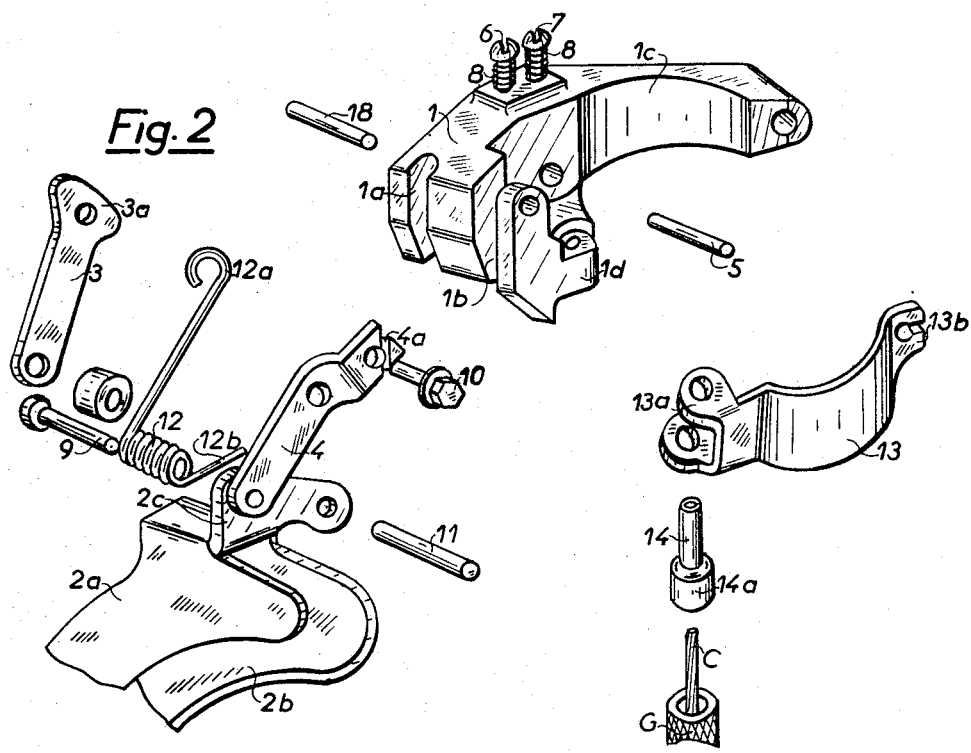
FIG. 2 is an exploded view of the speed-change mechanism.
Figure 4:
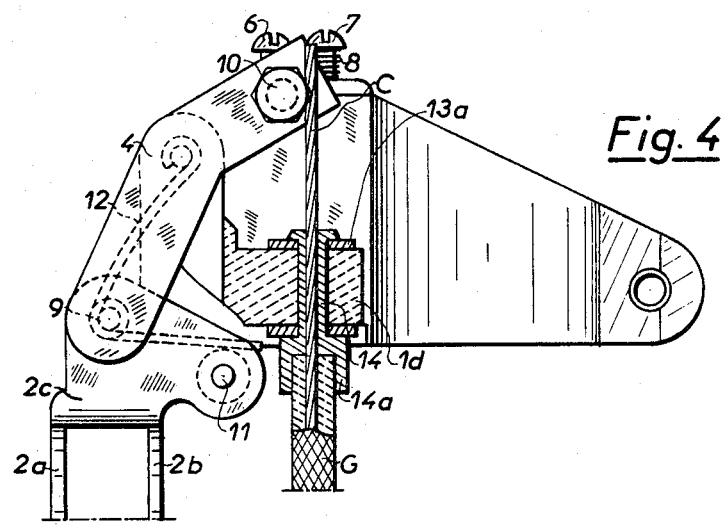
FIG. 4 is an elevation view, partly in section, along line 4—4 of FIG. 3, and FIGS. 5 and 6 are elevation views partly in section taken on line 5—5 of FIG. 3, showing the two extreme stop positions for transverse shifting of a fork included the mechanism.

Referring to the drawing, therein is shown a speed-change mechanism adjacent the drive or crank gear mechanism of a bicycle or like vehicle. The speed-change mechanism comprises a casing 1, a fork 2, and two levers 3 and 4 pivotably connecting the casing and the fork together to form a pantograph or parallelogram arrangement such that two profiled wings 2a and 2b of the fork always remain mutually parallel in all transverse shift positions of chain C relative to selector or sprocket plates P and P$_1$ of the crank gear mechanism. Two selector plates are shown in FIG. 1 but there may be more.

The casing 1 is formed with a groove 1a to receive the lever 3 whose major portion is protected inside the casing. Groove 1a is open at the bottom and front.

Lever 3 is pivotally mounted on a hinge pin 5 inside the casing. The inner end of lever 3 is formed with a flat surface 3a which is offset relative to pin 5, so as to be alternately stopped by the ends 6a and 7a of screws 6 and 7 which are threaded into the top of the casing 1 and enter into the groove 1a. The heads of screws 6,7 are engagable so that they can be turned to adjust the stop positions of their ends 6a and 7a and, consequently, the limits of transverse positions of the fork 2.

Springs 8 are interposed between the heads of the screws 6 and 7 and casing 1 to resist any disturbance of the setting of the screws.

The casing is formed with a second groove 1b in which lever 4 is loosely received. The lever 4 is pivotally mounted on a hinge pin 18. Lever 4 is made in the form of a bent lever one end of which is pivotally mounted on pin 9 to be coupled to a lug 2c of the fork. A locking means such as a screw and washer 10 is mounted at the other end of lever 4 to secure thereat the end of a control cable C. A notch 4a is made in this end of the lever 4 so as to facilitate the location and retention of the end of the cable. Lug 2c of the fork extends from the portion joining the wings 2a, 2b.

Pin 9 is elongated and fitted with a head to accept the coils of a spring 12 having one arm 12a which engages pin 18 within the groove 1b in casing 1. The other arm 12b of the spring acts against a pivot pin 11 engaged in lug 2c and supporting lever 3. Consequently, when the control so allows, spring 12 urges the end 3a of the lever 3 against the stop 7a.

The casing 1 has a curved portion 1c adapted for fitting around a frame tube T or other suitable tube or portion of the bicycle frame.

A forked end 13a of a bracket 13 is mounted on a hinge pin assembly 14 engaged in a support portion 1d of the casing. The portion 1d is so shaped and dimensioned to permit sufficient angular turning of the bracket 13 to enable the casing and the bracket to clasp together around tube T and be tightly secured thereto. The assembly 14 is formed at its lower end with a sleeve 14a which receives the end of the cable sheath G and serves as an abutment therefor. Cable C is threaded through pin assembly 14 which is axially bored to allow the cable to pass to the end of lever 4 to be secured thereto.

Figure 3:
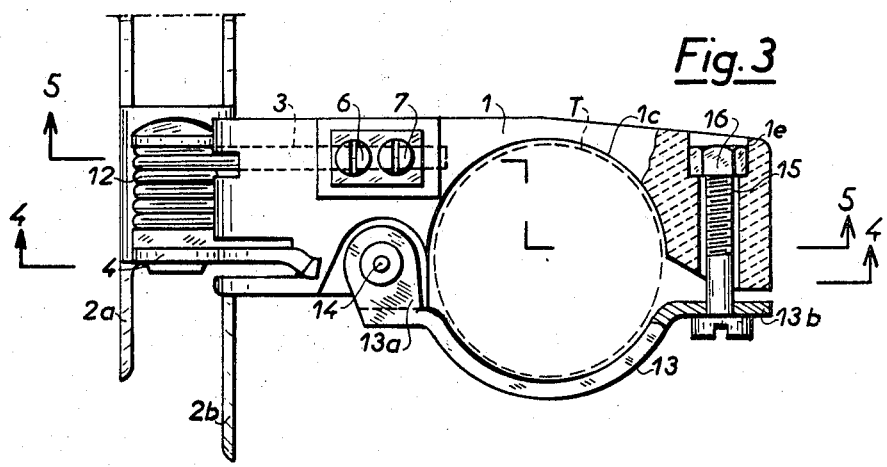
FIG. 3 is a plan view on enlarged scale of the speed-change gear mechanism.
Figure 5:
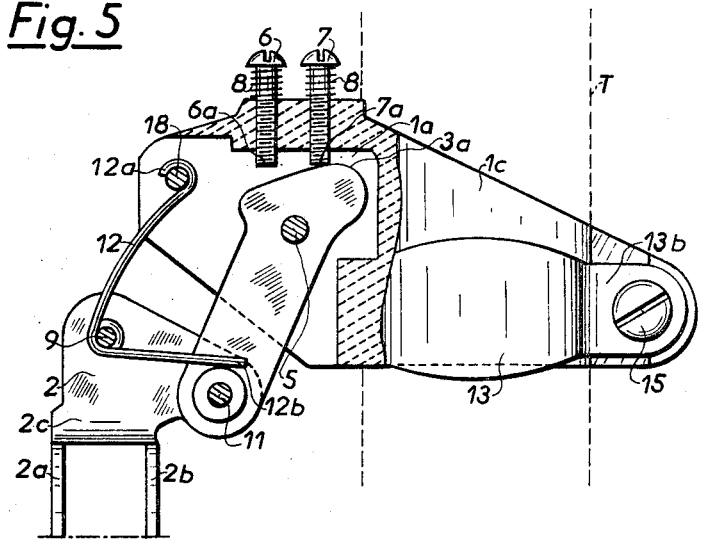
Figure 6:
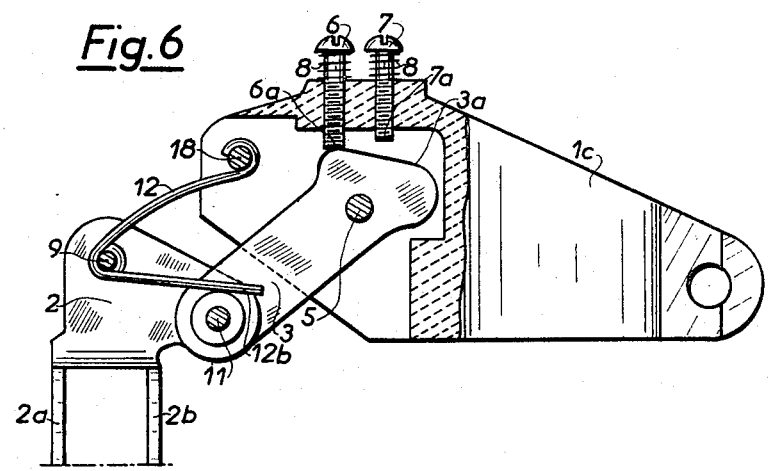

The free end of the bracket 13 is formed with a hole 13b to receive a screw 15 (FIG. 3). The screw 15 is engageable in a threaded nut 16 countersunk in a recess 1e of the casing. Nut 16 is provided with a flat surface or similar arrangement so as to be angularly secured in position in the recess 1e.

According to a significant feature of the invention, the casing 1 is made of a precision-molded plastic material (e.g., nylon) in a one piece body. The other parts described are made of metal.

The speed-change mechanism has the following advantages:

the stop means, especially the ends 6a and 7a of the screws 6 and 7 and lever 3 are protected inside casing 1 and are not accessible to projections and external disturbing elements of any kind; operation is therefore assured;

the casing is strong because of its efficient design which simplifies construction and assembly, especially with respect to assembly 14 which couples the bracket to the casing and serves as a check for sheath G and a conduit for the cable C, the assembly is fixed to the casing.

the combination of a plastic casing with the other moving parts of metal, principally cut, stamped or turned is efficient and economical since the cost price can be reduced; it is no longer necessary to clad the casing with a protective covering, and thus the casing is light in weight; this lightness in weight is of great significance for racing bicycles; the lightening also comes about by the efficient design of the moving parts and their assembly, particularly the use of a single assembly 14 for the bracket and as a sheath-stop and cable guide;

the judicious combination of plastic and metal lessens friction between the moving parts in the course of their relative displacements and makes for smoother running;

the assembly is compact, and takes up minimum of space; the casing is stronger because of this arrangement which also has an esthetic appearance.

The invention is no way limited to the embodiments which have been specifically disclosed but in contrast covers all modifications and variations which are encompassed within the scope of the appended claims.

What is claimed is:

1. In a speed-change mechanism for the crank gears of a bicycle or similar vehicle in which a fork is displaceable to effect transverse displacement of a chain in a speed-change operation; and a deformable linkage means supports the fork for movement in opposite directions between two adjustable stops, an improvement comprising a protective casing adapted for attachment to a frame of the vehicle proximate the crank gears, said linkage including a pair of levers, and hinge pins joining the levers to said casing, said hinge pins being received in said casing and being substantially completely enclosed thereby, said casing being provided with a groove pivotably receiving one of said levers and the two stops, said one lever having a major portion in said groove and including non-circular end portions in said groove for engaging said stops.

2. An improvement as claimed in claim 1 wherein said non-circular portion is flattened.

3. An improvement as claimed in claim 1 wherein said groove has an open bottom and one lateral side.

4. An improvement as claimed in claim 3 wherein said stops are constituted by respective members threaded into said casing at the top of said groove.

5. An improvement as claimed in claim 1 wherein said casing has a second groove through which the second said lever pivotably extends, said second lever having a free end, and means at said free end for securing a control cable thereat.

6. An improvement as claimed in claim 5 wherein said casing includes a curved portion adapted for partially embracing a tubular frame of the vehicle, a hinged bracket on said casing and fixable thereto to fully embrace the tubular frame and secure the casing thereto.

7. An improvement as claimed in claim 6 comprising a hinge pin assembly connecting the bracket to the casing and including a first hollow portion for guided passage of the control cable to the second lever.

8. An improvement as claimed in claim 7 wherein said hinge pin assembly comprises a sleeve portion for receiving a sheath for the cable and serving as an abutment for such sheath.

9. An improvement as claimed in claim 7 comprising means for fixing the bracket to said casing including a threaded member rotatably carried by said bracket at the free end thereof and a nut secured in said casing for non-rotation therein, said threaded member being engageable in said nut.

10. An improvement as claimed in claim 1 wherein said casing is constituted on a one-piece molded plastic body.

11. An improvement as claimed in claim 5 wherein said linkage further comprises hinge pins connecting the levers to the fork, and a spring having coils mounted on the hinge pin connecting the second lever to the fork, said spring having one free end resting on the hinge pin which joins the first lever to the fork and a second free end engaged with the hinge pin joining said second lever to said casing.

* * * * *